United States Patent
Reis

(10) Patent No.: US 10,110,463 B2
(45) Date of Patent: Oct. 23, 2018

(54) PERSONAL COMMUNICATIONS DEVICE FOR MULTIPLE COMMUNICATIONS SYSTEMS

(71) Applicant: Higher Ground LLC, Palo Alto, CA (US)

(72) Inventor: Robert S. Reis, Palo Alto, CA (US)

(73) Assignee: Higher Ground LLC, Palo Alto, CA (US)

( * ) Notice: Subject to any disclaimer, the term of this patent is extended or adjusted under 35 U.S.C. 154(b) by 120 days.

(21) Appl. No.: 14/022,228

(22) Filed: Sep. 10, 2013

(65) Prior Publication Data

US 2017/0006620 A1 Jan. 5, 2017

Related U.S. Application Data

(60) Provisional application No. 61/699,821, filed on Sep. 11, 2012.

(51) Int. Cl.
*H04L 12/26* (2006.01)
*H04B 7/185* (2006.01)
(Continued)

(52) U.S. Cl.
CPC ......... *H04L 43/16* (2013.01); *H04B 7/18517* (2013.01); *H04B 7/18578* (2013.01);
(Continued)

(58) Field of Classification Search
CPC ...... H04W 88/06; H04W 36/14; H04W 36/30
(Continued)

(56) References Cited

U.S. PATENT DOCUMENTS 5,535,432 A * 7/1996 Dent ..................... H03L 7/1974
455/12.1
5,586,165 A * 12/1996 Wiedeman ......... H04B 7/18556
455/13.1
(Continued)

OTHER PUBLICATIONS

Handset: Smartphone, Texas Instruments, downloaded from web page: http://www.ti.com/solution/handset_smartphone, Downloaded date: Aug. 15, 2016, original posting date: unknown, 1 page.
(Continued)

*Primary Examiner* — Jaime Holliday
(74) *Attorney, Agent, or Firm* — Panitch Schwarze Belisario & Nadel LLP

(57) ABSTRACT

A portable communications device (PCD) for communications with two or more communications systems including a power unit, a transceiver unit and a control unit. The power unit is for powering the communications device so as to enable it to be portable. The transceiver unit includes a local unit for communicating with a local communications system and a satellite unit for communicating with a satellite communications system. The control unit is for controlling communications by the local unit and the satellite unit. The control unit includes a sensing algorithm for sensing requests for communications, a selection algorithm for automatically selecting the local unit or the satellite unit for communications. A software controlled transceiver unit is used together with parameter algorithms for automatically controlling communications and modifying the system budget.

13 Claims, 9 Drawing Sheets

(51) Int. Cl.
  *H04M 1/725* (2006.01)
  *H04W 84/04* (2009.01)
  *H04W 84/06* (2009.01)
  *H04W 88/06* (2009.01)
  *H04W 36/14* (2009.01)
  *H04W 36/30* (2009.01)

(52) U.S. Cl.
  CPC ........ *H04M 1/72536* (2013.01); *H04W 36/14* (2013.01); *H04W 36/30* (2013.01); *H04W 84/042* (2013.01); *H04W 84/06* (2013.01); *H04W 88/06* (2013.01)

(58) Field of Classification Search
  USPC .................. 455/426.1, 427, 552.1, 553.1
  See application file for complete search history.

(56) References Cited

U.S. PATENT DOCUMENTS

| | | | |
|---|---|---|---|
| 5,732,359 A * | 3/1998 | Baranowsky, II | H04B 7/18541 455/437 |
| 5,898,668 A | 4/1999 | Shaffer | |
| 6,061,579 A * | 5/2000 | Arai | H01Q 1/084 455/347 |
| 6,157,834 A * | 12/2000 | Helm | H04W 36/0066 455/12.1 |
| 6,400,946 B1 * | 6/2002 | Vazvan | H04B 7/18563 455/432.1 |
| 6,400,962 B1 * | 6/2002 | Yamada | H04B 7/18563 455/428 |
| 2003/0128671 A1 * | 7/2003 | Niesen | H04B 7/18508 370/313 |
| 2003/0143949 A1 * | 7/2003 | Karabinis | H04B 1/3805 455/12.1 |
| 2007/0049192 A1 * | 3/2007 | Hoffmann | H04H 20/63 455/3.02 |
| 2007/0213046 A1 | 9/2007 | Li et al. | |
| 2010/0056181 A1 | 3/2010 | Rippon et al. | |
| 2011/0136428 A1 * | 6/2011 | Ritter | H04B 7/18517 455/13.4 |
| 2011/0241827 A1 * | 10/2011 | Varoglu | H04B 7/185 340/5.52 |
| 2012/0127922 A1 | 5/2012 | Feher | |
| 2012/0147040 A1 | 6/2012 | Yun | |
| 2012/0231729 A1 * | 9/2012 | Xu | G01S 19/21 455/13.4 |
| 2013/0018529 A1 * | 1/2013 | Ploschnitznig | H04B 7/18517 701/2 |
| 2013/0273964 A1 * | 10/2013 | Patino | H04W 52/0277 455/552.1 |
| 2014/0055490 A1 | 2/2014 | Mule et al. | |

OTHER PUBLICATIONS

Office Action dated Nov. 16, 2017 in U.S. Appl. No. 14/106,868, by Reis

* cited by examiner

FIG. 3
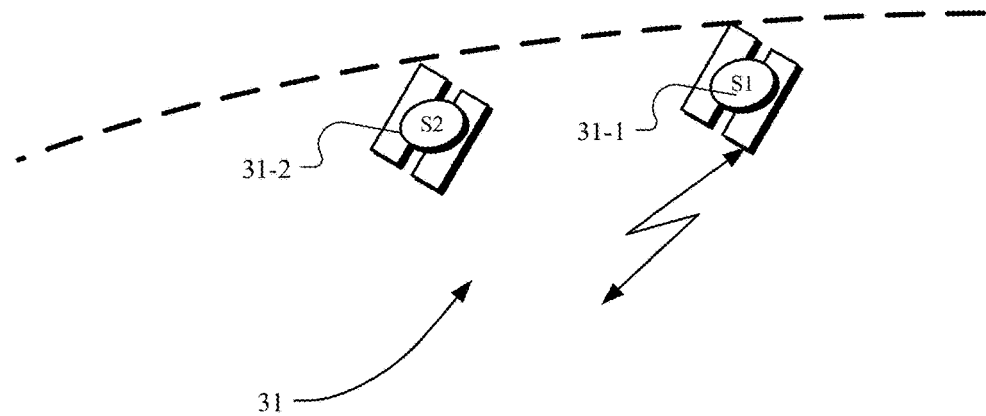
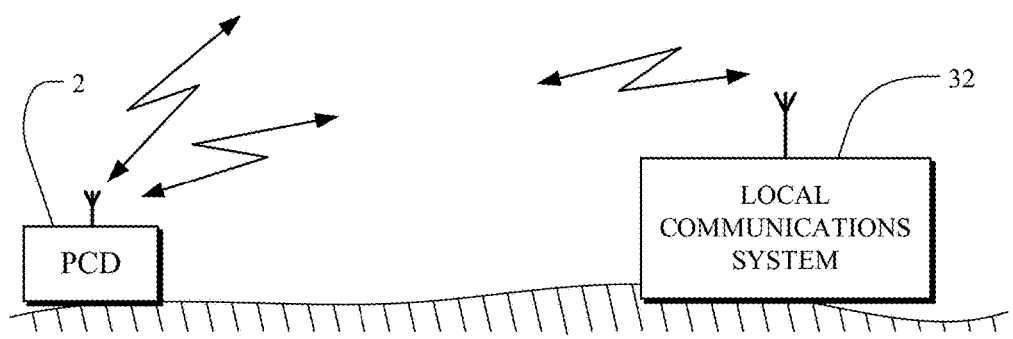

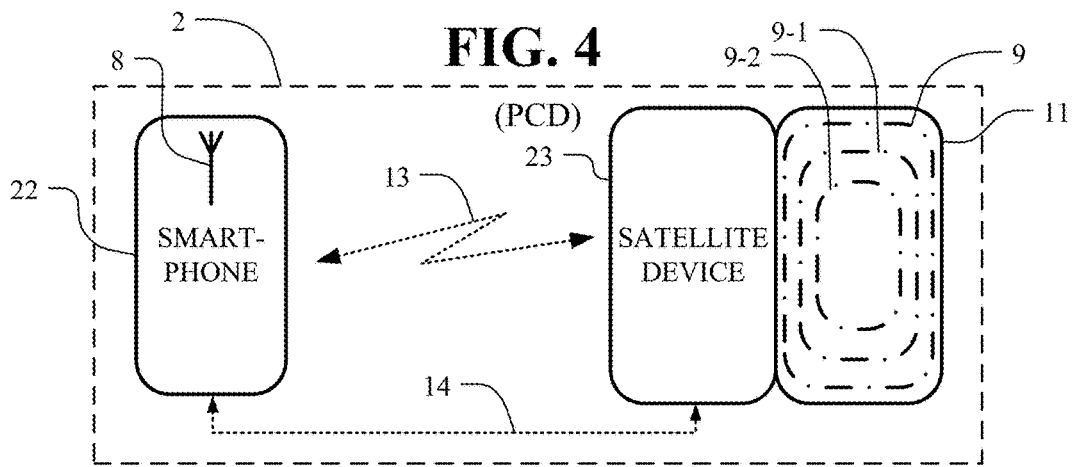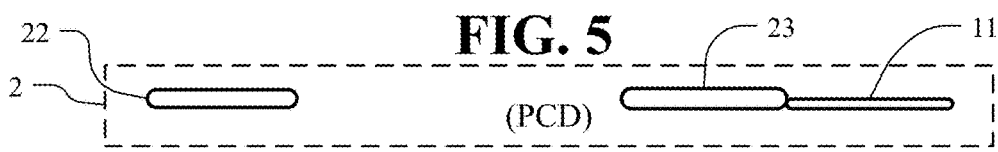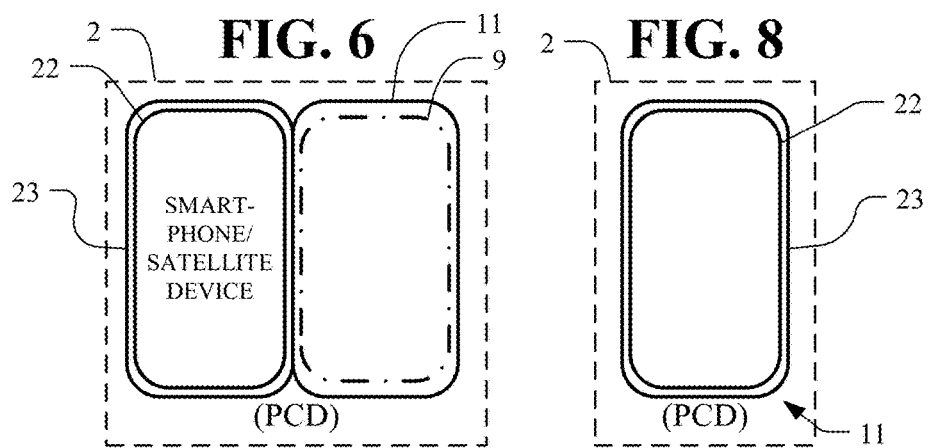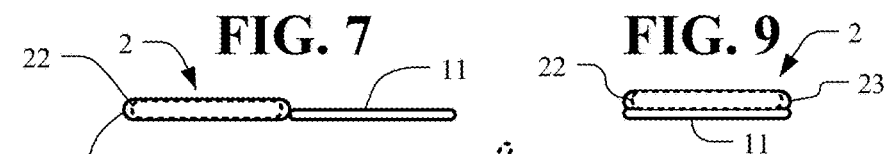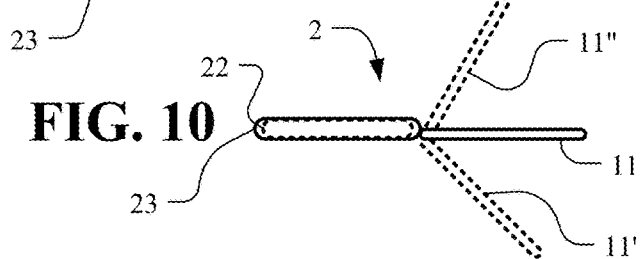

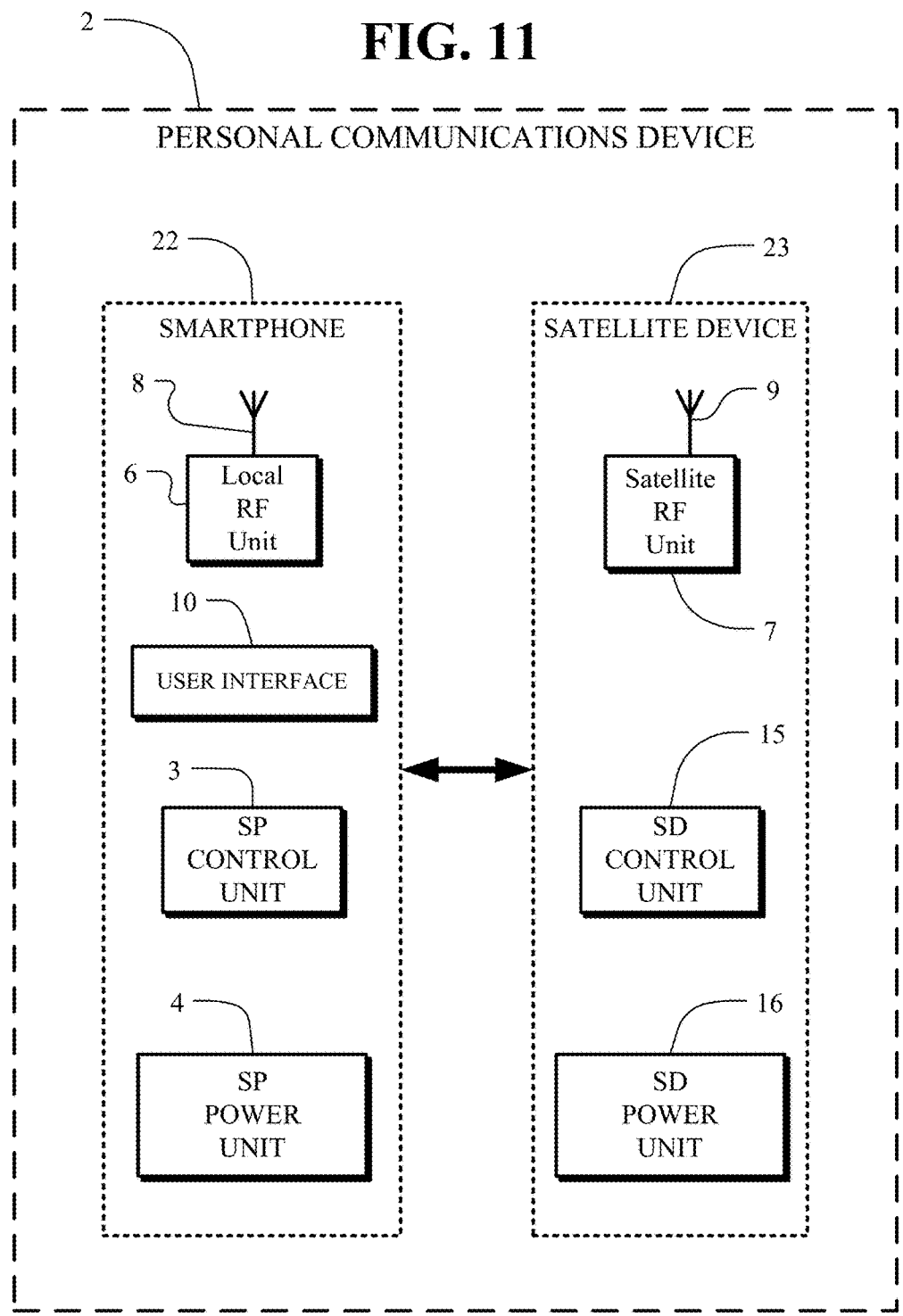

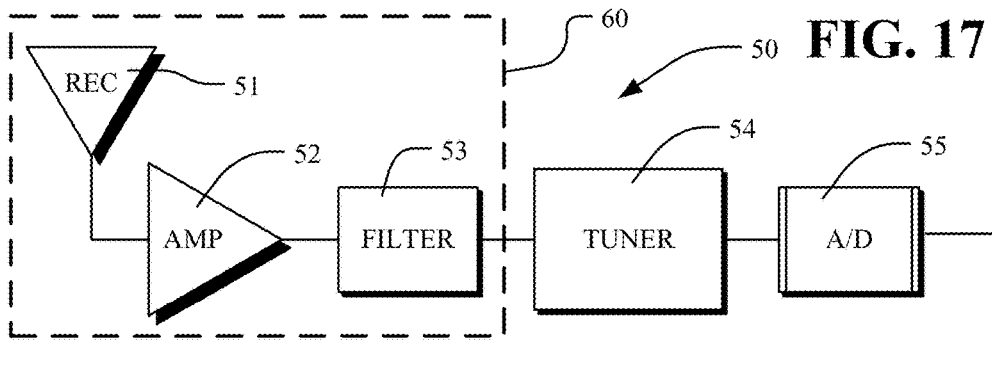
FIG. 17
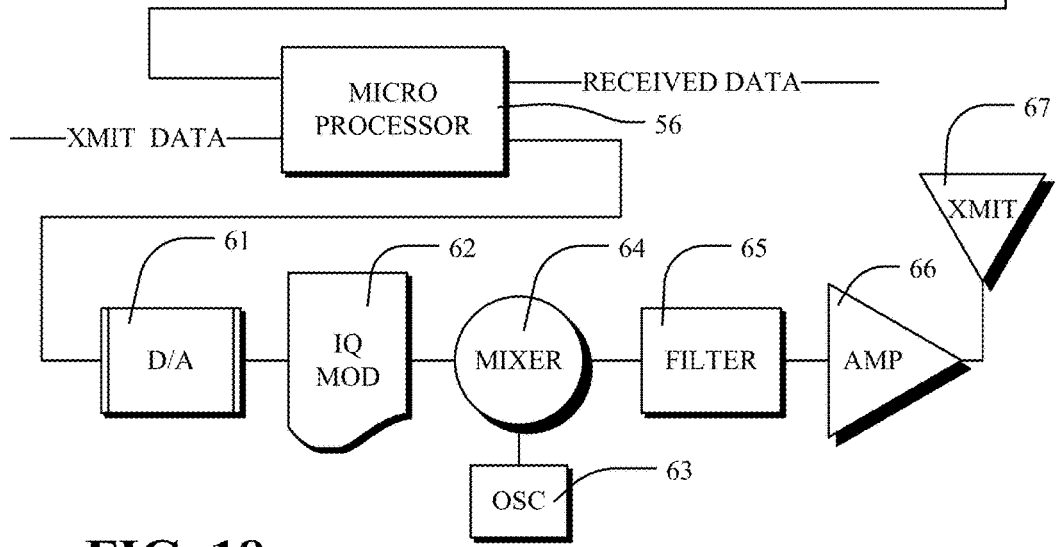
FIG. 18
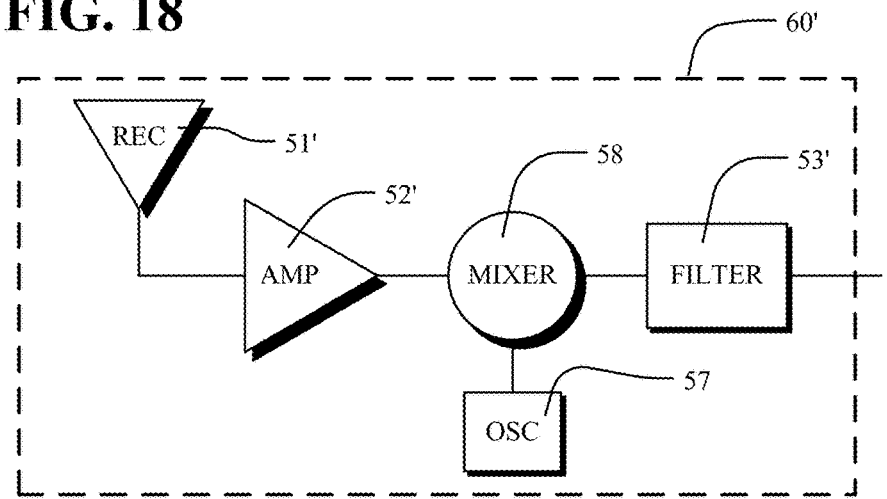

PERSONAL COMMUNICATIONS DEVICE FOR MULTIPLE COMMUNICATIONS SYSTEMS

BACKGROUND OF THE INVENTION

This invention relates to personal communications devices such as cell phones and other mobile communications devices.

Personal communications devices transmit and receive telephone calls and other communications using a radio link that covers a wide geographic area. Typically, personal communications devices, such as smartphones, communicate in a cellular system provided by a cellular operator. The cellular system allows access to the public-switched telephone network (PSTN).

In cellular systems, mobile stations such as smartphones communicate in a small geographic area called a cell. The mobile stations ("users") in a cell communicate with a Base Station (BS) which handles all the cellular calls for users in the cell. Each cell covers a small geographic area and collectively an array of adjacent cells covers a larger geographic region. Cells are of different sizes and are generally fixed in capacity. The actual shapes and sizes of cells are complex functions of the terrain, the man-made environment, the quality of communication and the user capacity required. Cells are connected to each other via land lines or microwave links and to the public-switched telephone network (PSTN) through telephone switches that are adapted for mobile communications. The switches provide for the hand-off of users from cell to cell and thus from frequency to frequency as mobile users move between cells.

In conventional cellular systems, each cell has a base station with RF transmitters and RF receivers co-sited for transmitting and receiving communications to and from cellular users in the cell. The base station employs forward RF frequency bands (carriers) to transmit forward channel communications to users and employs reverse RF carriers to receive reverse channel communications from users in the cell.

The forward and reverse channel communications use separate frequency bands so that simultaneous transmissions in both directions are possible. This operation is referred to as frequency domain duplex (FDD) signaling.

A base station in addition to providing RF connectivity to users also provides connectivity to a Mobile Telephone Switching Office (MTSO). In a typical cellular system, one or more MTSO's will be used over the coverage region. Each MTSO can service a number of base stations and associated cells in the cellular system and supports switching operations for routing calls between other systems (such as the PSTN) and the cellular system or for routing calls within the cellular system.

Base stations are typically controlled from the MTSO by means of a Base Station Controller (BSC). The BSC assigns RF carriers to support calls, coordinates the handoff of mobile users between base stations, and monitors and reports on the status of base stations. The number of base stations controlled by a single MTSO depends upon the traffic at each base station, the cost of interconnection between the MTSO and the base stations, the topology of the service area and other similar factors.

A handoff between base stations occurs, for example, when a mobile user travels from a first cell to an adjacent second cell. Handoffs also occur to relieve the load on a base station that has exhausted its traffic-carrying capacity or where poor quality communication is occurring. The handoff is a communication transfer for a particular user from the base station for the first cell to the base station for the second cell.

Conventional cellular implementations employ one of several techniques to reuse RF bandwidth from cell to cell over the cellular domain. The power received from a radio signal diminishes as the distance between transmitter and receiver increases. All of the conventional frequency reuse techniques rely upon power fading to implement reuse plans. In a frequency division multiple access (FDMA) system, a communications channel consists of an assigned particular frequency and bandwidth (carrier) for continuous transmission. If a carrier is in use in a given cell, it can only be reused in cells sufficiently separated from the given cell so that the reuse site signals do not significantly interfere on the carrier in the given cell. By example, the cellular Advanced Mobile Phone System (AMPS) used previously in the United States employed Frequency Division Multiple Access (FDMA) communications between base stations and mobile cellular telephones. Newer cellular systems do the same.

In addition to telephony, modern mobile phones also support a wide variety of other services such as text messaging, multimedia service, email, internet access, short-range wireless communications (infrared, Bluetooth), business applications, gaming and photography. Mobile phones that offer these and more general computing capabilities are referred to as smartphone devices and smart personal communications devices.

The demand and need for personal communications devices is expanding at a rapid pace. There is a need for devices that provide reliable two-way communications virtually anywhere on the earth even when a cellular or other local communications may not be available.

In connection with recreational communications, cellular communications commonly are not adequately available in many recreation areas such as ski areas, fishing areas, hiking areas, boating areas and so on. There is a need for communications devices that operate in virtually all recreation areas.

In recreational pursuits, there is often a need for casual communications, urgent communications and emergency communications. In an example of casual communication, a user may climb to the top of a mountain and send a text message saying, "I made it to the top". In an example of an urgent communication, a user on a hike might need to do a web search for "snake bite treatment". In an example of an emergency communication, a person in real trouble with a medical emergency might need to communicate the person's location and the nature of the emergency to first responders.

In connection with business communications, there is a need for many services in any location in the world both when there is and when there is not cell or other coverage. Examples of such services include checking for and responding to emails, polling of mail boxes to retrieve messages and to determine if a response is needed, messaging to send and receive text messages, choice of services to select the most economical communications system.

In connection with vehicle communications, there is a need for reliable two-way communications virtually anywhere that the vehicle travels irrespective of whether cellular or other local communications are available. In a vehicle, voice and text messaging may require special constraints due to the distraction that may occur during driving. Vehicle voice mail is something that the driver could easily dictate to leave a message wherever needed. In vehicle emergencies, the ability to call for assistance from anywhere in the world to report the location and the nature of the emergency is needed.

In connection with rural communications, there is a need for communications when cellular or other local communications systems are not adequately available. Cellular and other telephony coverage in rural areas is often not adequate because the expense of such services has been determined to be commercially unattractive. There are today 270% more casualties in rural areas of the United States than in urban areas. There are many reasons for this rural excess. In rural areas, the distances to hospitals are greater; there are fewer ambulances; there are undivided and otherwise poorer roadways. However, poor communications systems exacerbate the problem. In rural areas because of poor or no cell coverage, calls for help are delayed and response times are delayed.

In connection with some emergencies, often there is disruption of normal communications channels. These disruptions can be local and national in scope. Hurricanes, tornadoes, earthquakes and floods tend to extend over large geographic areas and often electrical grid power is lost. Sometimes the only way to get information to many people is via battery-powered devices. Although hand-held cell phone devices have their own battery power, they do not function in an emergency because cell-phone towers, emergency police/fire repeaters and other equipment fails due to a loss of grid power. Accordingly, when grid power fails, cellular, walkie-talkie and other communications equipment also fails.

Satellite communications provide an alternative to cellular and other terrestrial communications. A satellite constellation is a group of satellites working together to provide coordinated ground coverage.

Low Earth Orbiting satellites (LEOs) are often deployed in satellite constellations, because the coverage area provided by a single LEO satellite only covers a small area on the ground. The area covered moves as the satellite travels at a high angular velocity. A high angular velocity is needed in order to maintain the LEO satellite in orbit. Many LEO satellites are needed to maintain continuous coverage over an area. LEO satellites contrasts with geostationary satellites (GEOs) where a single GEO satellite, moving at the same angular velocity as the rotation of the Earth's surface, provides permanent coverage over a large area.

Examples of satellite constellations include the Global Positioning System (GPS), Galileo and GLONASS constellations for navigation and geodesy, the Iridium and Globalstar satellites for telephony services, the Disaster Monitoring Constellation and RapidEye for remote sensing, the Orbcomm satellites for messaging service, the Russian elliptic orbit Molniya and Tundra constellations and the Cospas-Sarsat search and rescue satellites.

Broadband applications benefit from low-latency communications, so LEO satellite constellations provide an advantage over a geostationary satellite. The minimum theoretical latency for a GEO satellite is about 250 milliseconds, compared to milliseconds for a LEO satellite. A LEO satellite constellation can also provide more system capacity by frequency reuse across its coverage, with spot beam frequency use being analogous to the frequency reuse of cellular base station radio towers. However, LEO satellites suffer from a scan problem. When a user wishes to initiate communications, it may be minutes or hours before a LEO satellite is above the horizon and can begin the communications.

The Cospas-Sarsat satellites are used in a satellite-based search and rescue (SAR) distress, alert, detection and information distribution system that detects and locates emergency beacons activated by aircraft, ships and backcountry hikers in distress. The system consists of ground and space segments including distress radio beacons for life-threatening emergencies, signal repeaters and signal processors aboard satellites, satellite downlink receiving and signal processing stations, control centers that distribute distress alert data and coordination centers that coordinate responses to distress situations. The system includes five geosynchronous GEO satellites and six low-earth polar orbit LEO satellites.

The Iridium satellite constellation is a large group of satellites providing voice and data coverage to satellite phones, pagers and integrated transceivers over Earth's entire surface. Iridium Communications Inc. owns and operates the constellation and sells equipment and access to its services. The constellation operates 66 active satellites in orbit to complete its constellation and additional spare satellites are kept in-orbit to serve in case of failure. Satellites are in low Earth orbit at a height of approximately 485 mi (781 km) and inclination of 86.4°. Orbital velocity of the satellites is approximately 17,000 mph (27,000 km/h). Satellites communicate with neighboring satellites via Ka band inter-satellite links.

Globalstar is a satellite company formed as a joint venture of Loral Corporation and Qualcomm. Globalstar satellites are simple "bent pipe" repeaters. A network of ground gateway stations provides connectivity from the satellites to the public switched telephone network and internet. Globalstar orbits have an inclination of 52 degrees and an orbital height of approximately 1400 km. Due to the lack of inter-satellite linking, a satellite must have a gateway station in view to provide service to any users it may see. Globalstar is the world's largest provider of mobile satellite voice and data services. A Globalstar subsidiary, SPOT LLC, has launched a handheld satellite messaging and tracking personal safety device known as the SPOT Satellite Messenger. This device provides one-way communications to a Globalstar satellite. This product has been quite successful in the market. Although it is used to send an emergency alert and a location to the authorities, the SPOT device has no way of receiving an acknowledgement that the alert was received.

Orbcomm satellites are low earth orbit communications satellites (LEOs) operated by the United States satellite communications company Orbcomm, Inc. At one time, 44 Orbcomm-1 satellites made up the Orbcomm constellation. Orbcomm Generation 2 (OG2) satellites are intended to supplement and eventually replace the Orbcomm-1 satellites.

Inmarsat is a satellite telecommunications company offering global, mobile services. Inmarsat provides telephony and data services to users worldwide, via portable or mobile terminals which communicate to ground stations through geostationary telecommunications satellites. Inmarsat's network provides communications services to a range of governments, aid agencies, media outlets and businesses with a need to communicate in remote regions or where there is no reliable terrestrial network. In addition to its commercial services, Inmarsat provides global maritime distress and safety services (GMDSS) to ships and aircraft at no charge.

The Inmarsat satellites are transponders that receive signals and then retransmit them to ground stations. Ground stations maintain usage and billing data and function as gateways to the public switched telephone network and the Internet.

Inmarsat services include voice calls, low-level data tracking systems, and high-speed Internet and other data services as well as distress and safety services. Inmarsat has provided GPRS-type services at up to 492 kbit/s via the Broadband Global Area Network (BGAN) internet protocol (IP). Inmarsat uses a satellite modem about the size of a notebook computer. Inmarsat has provided mobile Integrated Services Digital Network (ISDN) services used by the media for live reporting on world events via videophone.

The prices of calls via Inmarsat have dropped to levels where they are comparable, and in many cases favorable, to international roaming prices or hotel phone call prices. Voice call charges are the same for any location in the world where the service is used. Tariffs for calls to Inmarsat country codes vary, depending on the country in which they are placed.

Although cellular communications systems and satellite communications systems each provide acceptable communications under certain conditions, neither of the systems are fully adequate as presently operated.

Some attempts have been made to provide phones that communicate with either cellular or satellite communications. AT&T offered a TerreStar Genus™ Dual-Mode Cellular/Satellite Smartphone. However that device did not switch between cellular and satellite networks automatically but required manual selection by the user. In general, the system budget for such dual mode devices was not adequate for satisfactory communication and for automatic selection of communications channels without necessity of user intervention.

In consideration of the above background, there is a need for improved personal communications devices that can communicate from most all locations of the world and function even when cellular or other terrestrial communications fail or are otherwise not available.

SUMMARY

The present invention is a portable communications device (PCD) for communications with two or more communications systems including a power unit, a transceiver unit and a control unit. The power unit is for powering the communications device so as to enable it to be portable. The transceiver unit includes a local unit for communicating with a local communications system and a satellite unit for communicating with a satellite communications system. The control unit is for controlling communications by the local unit and the satellite unit. The control unit includes a sensing algorithm for sensing requests for communications, a selection algorithm for automatically selecting the local unit or the satellite unit for communications.

In some embodiments, the control unit includes a parameter algorithm for controlling communications for the device based upon parameters such as a low battery parameter, a bandwidth parameter for controlling data rate and a software parameter for controlling software to modify the system budget in a software controlled transceiver.

In one embodiment, the sensing algorithm senses manual inputs from a user requesting a communication and/or senses automatic conditions for initiating or controlling communications. The automatic conditions, for example, sense when a portable communications device is operating with a local unit using cellular communication and when the cellular communication has a high error rate resulting in a dropped cellular call. The control unit senses the dropped call and automatically senses the need for and selects a satellite communication to the same called party (called number or called address). Similarly, the sensing algorithm, after initiating a satellite call in response to a dropped cellular call, senses the return of a satisfactory cellular signal, selects a cellular call and drops the satellite call once the cellular call is reestablished. Many other automatic operations are under control of the control unit. As another example, a portable communications device user may request a cellular call when a satisfactory cellular signal is not available. The control unit senses the condition and automatically selects a satellite call in place of the unavailable cellular call.

The control of communications by the local unit and the satellite unit involves many different parameters including the transmit power, receiver performance and antenna properties of the terminal on the ground; the satellite and the earth ground station; the communications properties of the radio medium and likely anomalies. These parameters all are represented in the system budget which is selected to provide an acceptable error rate. The system budget and key parameters of the communication link are adaptively changed to ensure that communications are reliable.

The foregoing and other objects, features and advantages of the invention will be apparent from the following detailed description in conjunction with the drawings.

BRIEF DESCRIPTION OF THE DRAWINGS

FIG. 3 depicts a schematic representation of a personal communications device of the FIG. 1 type deployed within communications range of terrestrial local communications systems and satellite communications systems.

FIG. 4 depicts a schematic representation of a top view of one embodiment a personal communications device of FIG. 1 showing the approximate sizes of a combination of a smart phone and a satellite device.

FIG. 5 depicts a schematic representation of an end view of the personal communications device of FIG. 4.

FIG. 6 depicts a schematic representation of personal communications device of FIG. 4 where the smart phone and a satellite device are nested together with the antenna flap open.

FIG. 7 depicts a schematic representation of an end view of the personal communications device of FIG. 6.

FIG. 8 depicts a schematic representation of personal communications device of FIG. 6 where the smart phone and a satellite device are nested together with the antenna flap closed.

FIG. 9 depicts a schematic representation of an end view of the personal communications device of FIG. 8.

FIG. 10 depicts a schematic representation of an end view of the personal communications device of FIG. 7 depicting by dotted lines the antenna rotated at different angles.

FIG. 11 depicts a schematic representation of a personal communications device formed as a combination of a smart phone and a satellite device.

Figure 1:
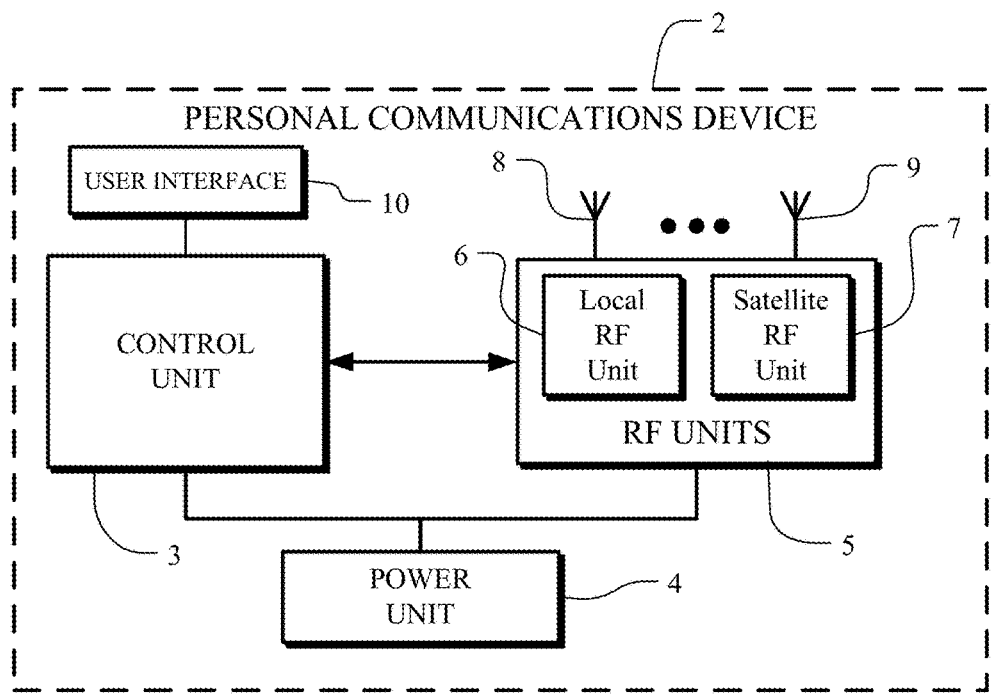
FIG. 1 depicts a schematic representation of a personal communications device.
Figure 15:
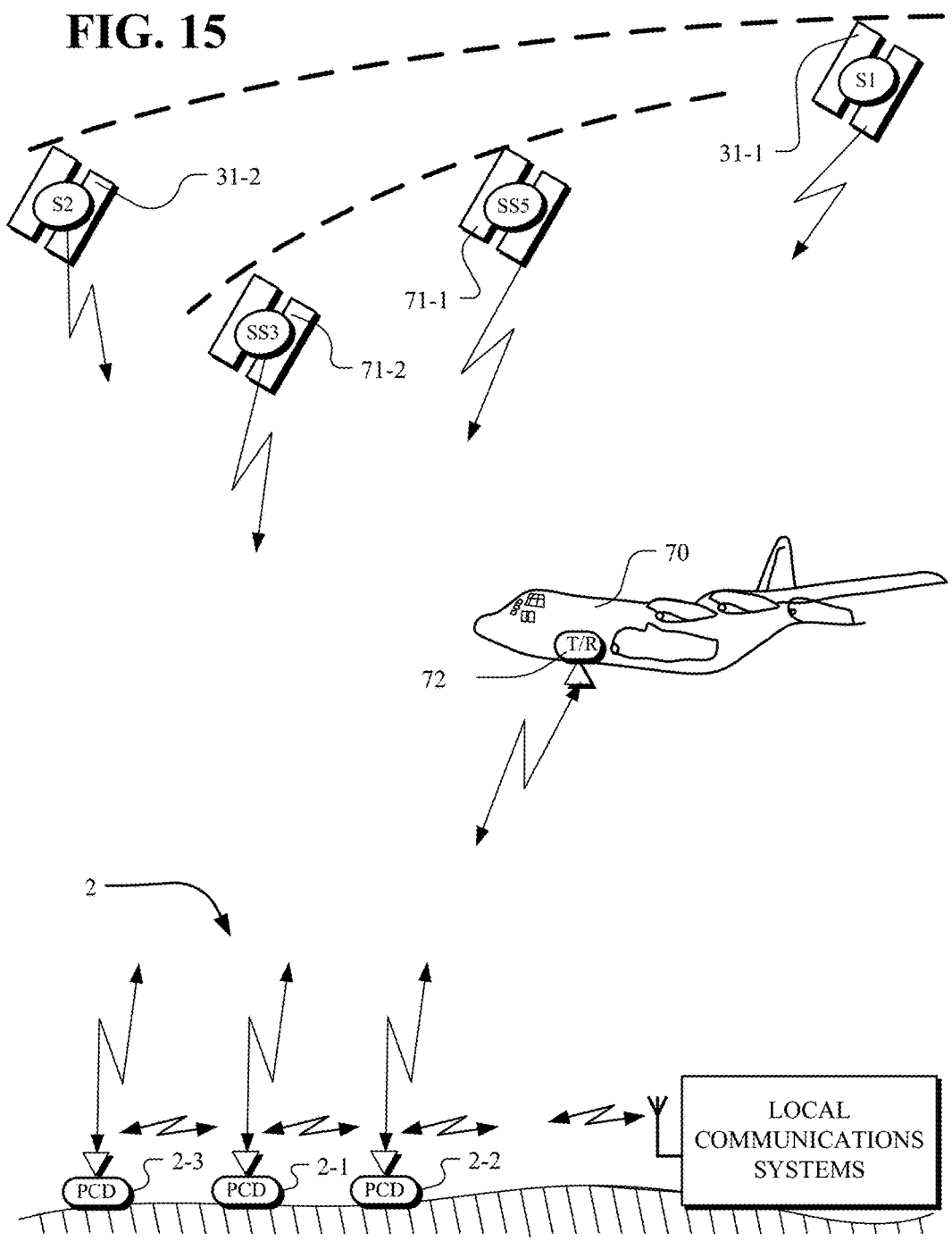

FIG. 15 depicts a schematic representation of personal communications devices of the FIG. 1 type deployed within communications range of multiple communications systems including terrestrial local communications systems, airborne systems and multiple satellite communications systems.

Figure 16:
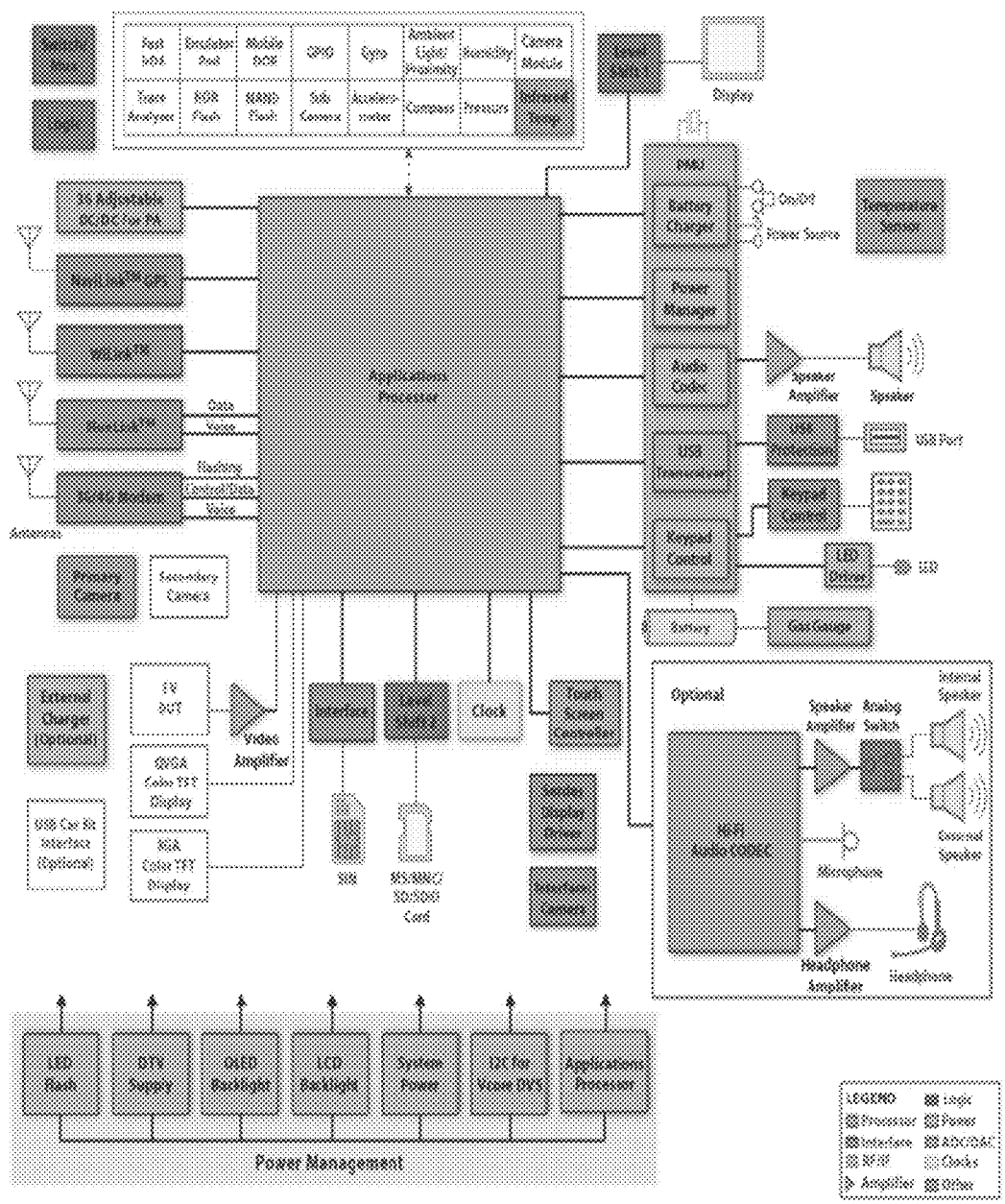

FIG. 16 depicts a detailed block diagram of a conventional smartphone.

FIG. 17 depicts a software defined transceiver.

FIG. 18 depicts an optional RF converter for extending the RF range of the transceiver of FIG. 17.

DETAILED DESCRIPTION

In FIG. 1, a schematic representation of a personal communications device 2 is shown including a control unit 3, a power unit 4 and a transceiver 5. The control unit 3 controls the communications of the personal communications device 2 and has the capacity to execute many different algorithms both hidden from user control and/or under user control. The power unit 4 includes one or more batteries to enable the personal communications device 2 to be portable. The transceiver 5 includes the components for communications in multiple communications systems. The multiple communications systems include local communications systems and include satellite communications systems. Typical local communications systems are cellular systems.

For local communications, the personal communications device 2 typically includes all the features of a smartphone and is thereby able to communicate in local environments using a cellular communications system. Examples of such smartphones are Apple's IPhone using the Apple operating system and Samsung's Galaxy using the Android operating system. Many other smartphones are available or are becoming available using the Apple, Android or other operating systems.

In addition to cellular communications, other local communications systems are, in some embodiments, included within the personal communications device 2. Examples of local communications systems for emergency, search and rescue are listed in the following TABLE 1.

TABLE 1

| Frequency (MHz.) | Name | Utility | Modulation |
| --- | --- | --- | --- |
| 121.5 | CAP | Civil Air Patrol | AM |
| 156.8 | Ch 16 | Marine | FM |
| 155.16 | | Mountain Rescue | FM |
| 154.28 | | Fire | FM |
| 155.475 | | Police | FM |

The transceiver 5 of personal communications device 2 includes components for satellite communications systems. Some of the satellite communications systems suitable for communications with the personal communications device 2 listed in the following TABLE 2:

TABLE 2

| Name | Provider |
| --- | --- |
| LEO | Cospas-Sarsat |
| LEO | Iridium |
| LEO | Globalstar |
| LEO | Orbcomm |
| GEO | Inmarsat |

Figure 2:
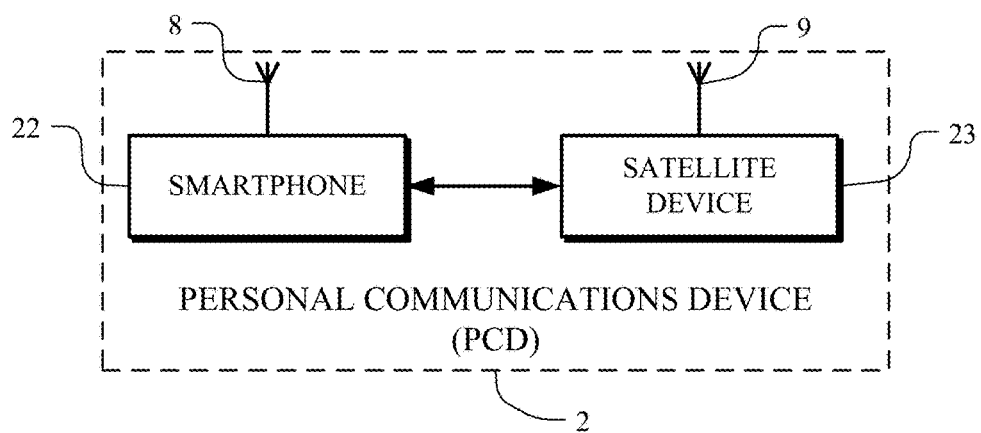
FIG. 2 depicts a schematic representation of a personal communications device formed as a combination of a smart phone and a satellite device.

In FIG. 2, a schematic representation of a personal communications device 2 formed as a combination of a smartphone 22 and a satellite device 23 is shown. The combination of the smartphone 22 and the satellite device 23 inherently includes the control unit 3, the power unit 4 and the transceiver 5 as described in connection with FIG. 1. These units 3, 4 and 5 can be either distributed or integrated. In a fully distributed embodiment, the smartphone 22 is essentially a standalone device like Apple's IPhone, Samsung's Galaxy or other readily available smartphones. These smartphones operate in widely available cellular systems. In the fully distributed embodiment, the satellite device 23 is an add-on to the smartphone 22, using where possible, components and operations of the smartphone 22 while providing the additional components and operations necessary for satellite communications. Among other things, the additional components for satellite operation include an antenna 9 and transceiver circuits suitable for satellite communications. The control unit 3 and power unit 4 components of the smartphone 22 can be shared, or shared in part, with the satellite device 23.

In FIG. 3, a schematic representation of a personal communications device 2 of the FIG. 1 type deployed within communications ranges of terrestrial local communications systems 32 and satellite communications systems 31 is shown. The satellite communications systems 31 includes satellites 31-1, 31-2 and so on forming a satellite constellation. Such constellation has shared controls to provide coordinated ground coverage for satellite communications with the personal communications device 2 and other ground based devices. The satellite communications system 31 includes earth orbiting satellites (LEO) or geosynchronous satellites (GEO) such as those identified in the foregoing TABLE 2.

In FIG. 3, the personal communications device 2 also communicates with the local communications system 32 which is typically a cellular communications system and/or any of the emergency, search and rescue communications systems of TABLE 1.

In FIG. 4, a schematic representation of a top view of one embodiment of the personal communications device 2 of FIG. 1 is shown. In FIG. 4, the approximate sizes of the smartphone 22 and the satellite device 23 of FIG. 2 are shown. In FIG. 4, the personal communications device 2 is a fully distributed embodiment where the smartphone 22 is essentially a standalone device like Apple's IPhone, Samsung's Galaxy or other readily available smartphones. In this fully distributed embodiment, the smartphone 22 communicates with the satellite device 23 with an RF link 13 (such as Bluetooth, WiFi or other) through the Bluetooth, WiFi or other facilities of the smartphone 22 and satellite device 23 or by a direct wire connection 14 through the wire plug connections of the smartphone 22 and satellite device 23. The satellite device 23 includes an area, such as flap 11, that contains the satellite antenna 9. The flap 11 in some embodiments includes multiple antennas 9, 9-1, 9-2 and so on having sizes and properties suitable for different ones of the satellite frequencies of satellite communications systems.

In FIG. 5, a schematic representation of an end view of the personal communications device 2 of FIG. 4 is shown. The smartphone 22 and the satellite device 23 are represented for purposes of illustration as separated by a distance. The distance in actuality may be of any amount from nothing to numbers of meters depending upon the embodiment selected. The distance, however, cannot exceed the communication range of the RF connection 13 or the wired connection 14.

In FIG. 6, a schematic representation of personal communications device 2 of FIG. 4 is shown where the smartphone 22 and the satellite device 23 are superimposed and nested together without any separation. The flap 11 holding the satellite antenna 9 is shown in the fully open position.

In FIG. 7, a schematic representation of an end view of the personal communications device 2 of FIG. 6 is shown where the smartphone 22 and the satellite device 23 are superimposed and nested together without any separation. The flap 11 is shown in the fully open position.

In FIG. 8, a schematic representation of personal communications device 2 of FIG. 6 is shown where the smart phone 22 and the satellite device 23 are nested together with the antenna flap 11 closed and under the superimposed smart phone 22 and satellite device 23.

In FIG. 9, a schematic representation of an end view of the personal communications device 2 of FIG. 8 is shown. The smart phone 22 and the satellite device 23 are nested together with the antenna flap 11 closed and under the superimposed smart phone 22 and satellite device 23.

In FIG. 10, a schematic representation of an end view of the personal communications device 2 of FIG. 6 is shown. The flap 11 is in a fully open position and can be rotated as depicted by dotted lines. The flap 11 is rotated in one direction to the position shown as 11' and is rotated in the opposite direction to the position shown as 11". The rotation of the flap 11 and therefore the antenna 9 assists in the good communication between the personal communications device 2 and a satellite 31.

In FIG. 11, a schematic representation of a personal communications device 2 formed as a combination of a smart phone 22 and a satellite device 23 is shown. The smartphone 22 includes a local RF unit 6, a user interface 10, a SP control unit 3 and an SP power unit 4. The local RF unit 6 operates to communicate with local communication systems such as cellular systems. The user interface 10 operates with inputs from and outputs to a user. For example, the inputs include keypad and audio inputs and the outputs include display and audio outputs. The SP control unit 3 includes a processor, storage and related devices for controlling operations of the smartphone 22 and the personal communications device 2. The SP control unit 3 executes code including algorithms useful or necessary for control operations. The SP power unit 4 includes a battery and other components for powering the smartphone 22 and the personal communications device 2.

The satellite device 23 includes a satellite RF unit 7, a SD control unit 15 and an SD power unit 15. The satellite RF unit 7 operates to communicate with satellite communication systems such as LEO and GEO systems. The satellite device 23 operates for user interface operations under control of the user interface 10 of smartphone 22. In alternate embodiments, satellite device 23 can include a user interface. The SD control unit 15 includes a processor, storage and related devices for controlling operations of the satellite device 23 and the personal communications device 2. The SD control unit 15 executes code including algorithms useful or necessary for control operations. The SD power unit 16 includes a battery and other components for powering the satellite device 23 and the personal communications device 2.

Figure 12:
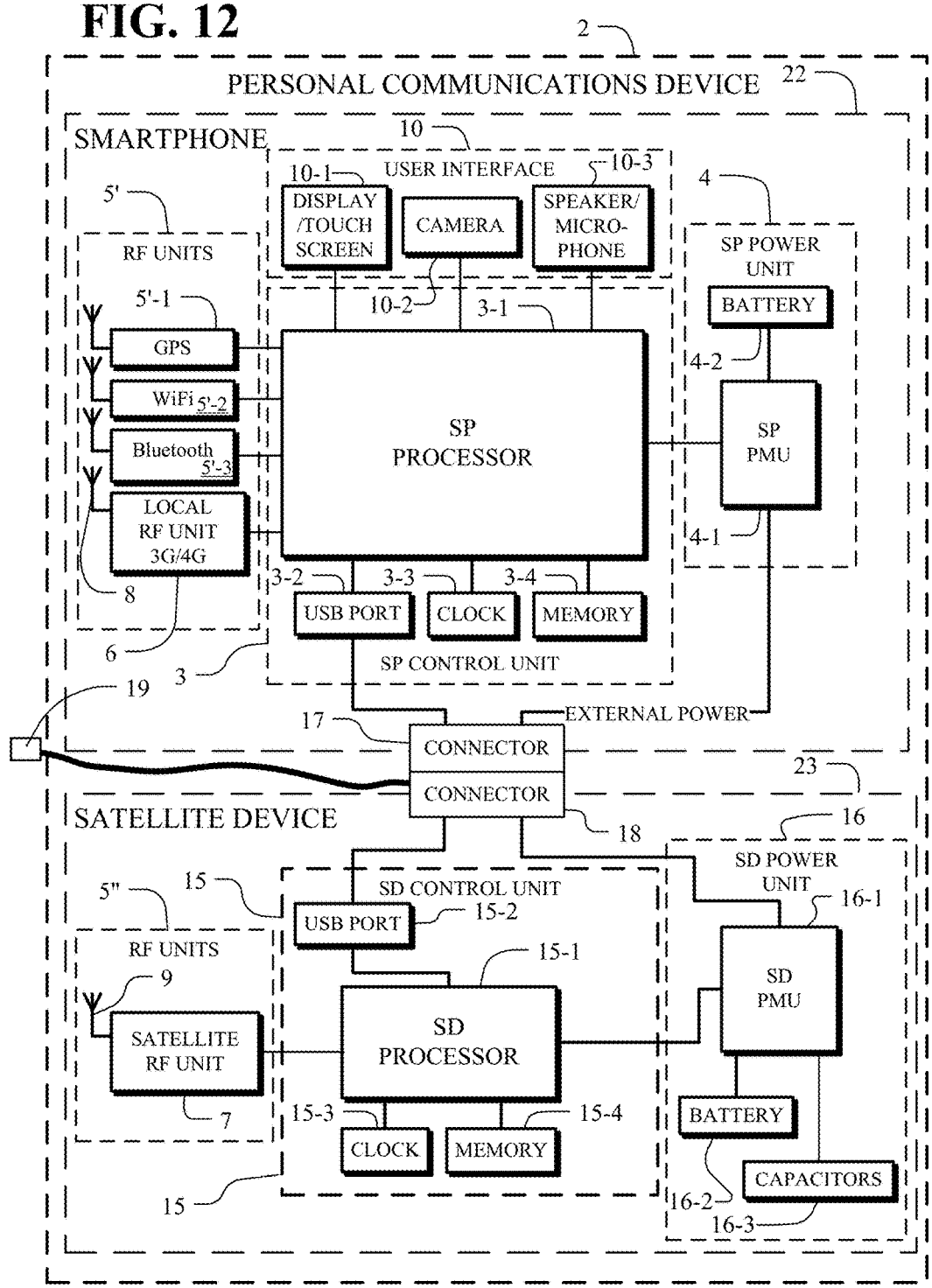
FIG. 12 depicts a schematic block diagram representation of further details of the personal communications device of FIG. 11.

In FIG. 12, a schematic block diagram representation of further details of the FIG. 11 personal communications device 2 is shown.

In FIG. 12, the smartphone 22 includes RF units 5', a user interface 10, a SP control unit 3 and an SP power unit 4. The RF units 5' includes a GPS unit 5'-1, a WiFi unit 5'-2, a Bluetooth unit 5'-3 and a local RF unit 6. The local RF unit 6 operates to communicate with local communication systems such as cellular systems. The user interface 10 includes a display/touch screen 10-1, a camera 10-2 and a speaker/microphone 10-3 and operates with inputs from and outputs to a user. For example, the inputs include keypad and audio inputs and the outputs include display and audio outputs. The SP control unit 3 includes a processor, storage and related devices for controlling operations of the smartphone 22 and the personal communications device 2. The SP control unit 3 executes code including algorithms useful or necessary for control operations. The SP power unit 4 includes a power management unit 4-1 and a battery 4-2 for powering the smartphone 22 and the personal communications device 2.

In FIG. 12, satellite device 23 includes RF units 5", an SD control unit 15 and an SD power unit 16. The RF units 5" include at least a satellite RF unit 7. The satellite RF unit 7 operates to communicate with satellite communication systems such as LEO and GEO systems. The SD control unit 15 includes a processor 15-1, a USB port 15-2, a clock 15-3 and storage including memory 15-4. The SD control unit 15 operates to control operations of the satellite device 23 and the personal communications device 2. The SD control unit 15 executes code, stored in memory 15-4, for performing algorithms useful or necessary for control operations. The SD power unit 16 includes an SD power management unit (PMU) 16-1, a battery 16-2 and super capacitors 16-3 for powering the satellite device 23 and the personal communications device 2. The satellite device 23 connects through connector 18 to the connector 17 of the smartphone 22. In one embodiment, the connector 18 is connected to a terminal 19 which provides the ability to recharge the battery 16-2 and capacitors 16-3 in the satellite device 23 and the battery 4 in the smartphone 22.

Figure 13:
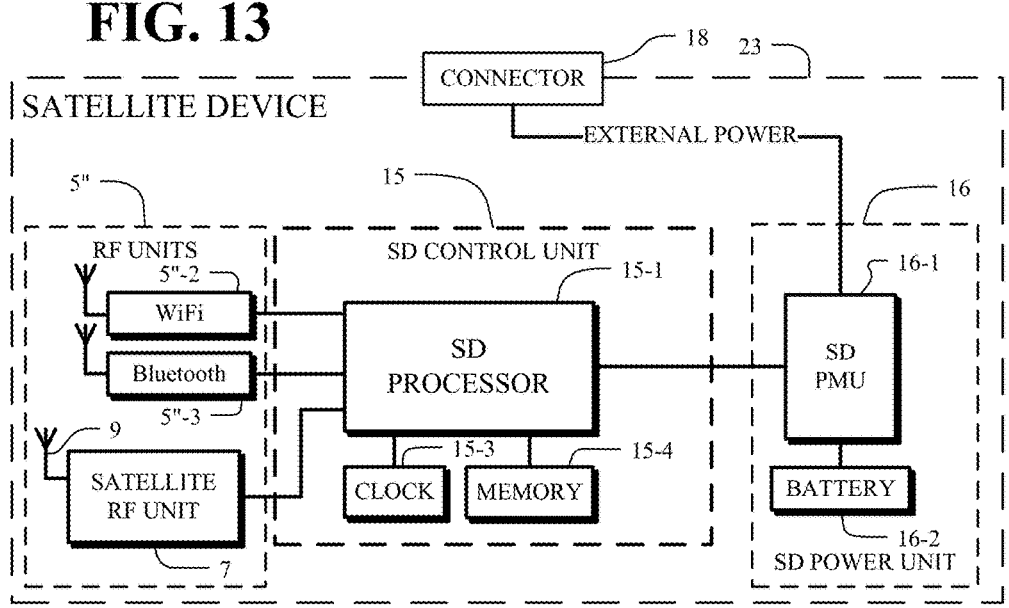
FIG. 13 depicts a schematic representation of another embodiment of the satellite device for use in the personal communications devices of the FIG. 12.

In FIG. 13, a schematic representation is shown of another embodiment of a satellite device 23 for use in the personal communications device 2 of FIG. 12. The satellite device 23 includes RF units 5", an SD control unit 15 and an SD power unit 16. The RF units 5" include a WiFi unit 5"-2, a Bluetooth unit 5"-3 and a satellite RF unit 7. The satellite RF unit 7 operates to communicate with satellite communication systems such as LEO and GEO systems. The WiFi unit 5"-2 and a Bluetooth unit 5"-3 are available for communicating with the WiFi unit 5'-2 and Bluetooth unit 5'-3 of the smartphone 22 of FIG. 12. The interaction between the smartphone 22 and the satellite device 23 is controlled by the Bluetooth and/or WiFi RF connections. The SD control unit 15 includes a processor 15-1, a clock 15-3 and storage including memory 15-4. The SD control unit 15 operates to control operations of the satellite device 23 and the personal communications device 2. The SD control unit 15 executes code, including algorithms useful or necessary for control operations, stored in memory 15-4. The SD power unit 16 includes an SD power management unit (PMU) 16-1 and a battery 16-2 for powering the satellite device 23 and the personal communications device 2.

Figure 14:
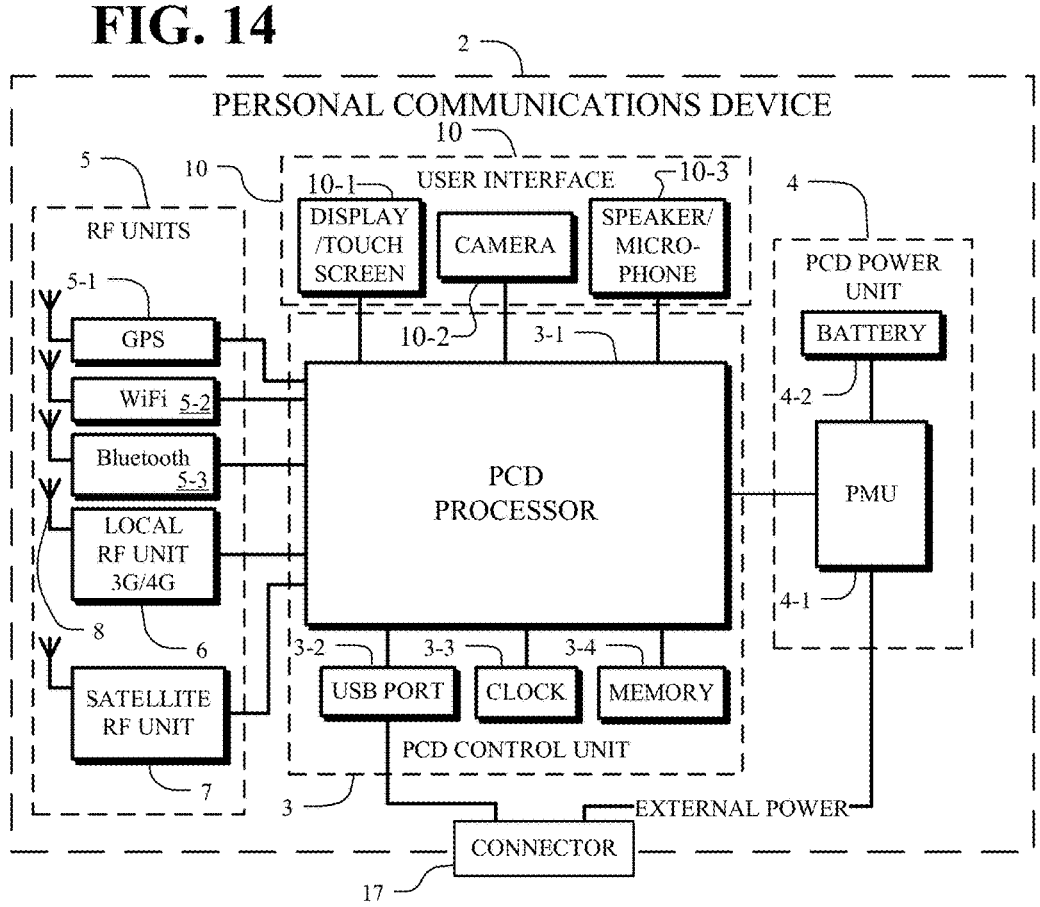
FIG. 14 depicts a schematic representation of another embodiment of a personal communications device of FIG. 1 where the local RF unit and the satellite RF unit are under common control in the same device.

In FIG. 14, a schematic representation is shown of another embodiment of a personal communications device 2 of FIG. 1 where the local RF unit 6 and the satellite RF unit 7 are under common control of the PCD control unit 3. In FIG. 14, the personal communications device 2 includes RF units 5, a user interface 10, a PCD control unit 3 and an PCD power unit 4. The RF units 5 include a GPS unit 5-1, a WiFi unit 5-2, a Bluetooth unit 5-3 and a local RF unit 6. The local RF unit 6 operates to communicate with local communication systems such as cellular systems. The user interface 10 includes a display/touch screen 10-1, a camera 10-2 and a speaker/microphone 10-3 and operates with inputs from and outputs to a user. For example, the inputs include keypad and audio inputs and the outputs include display and audio outputs. The PCD control unit 3 includes a processor, storage and related devices for controlling operations of the personal communications device 2. The PCD control unit 3 executes code including algorithms useful or necessary for control operations. The PCD power unit 4 includes a power management unit 4-1 and a battery 4-2 for powering the smartphone 22 and the personal communications device 2.

In FIG. 15, a schematic representation is shown of personal communications devices 2 of the FIG. 1 type deployed within communications range of multiple communications systems. The communications systems of FIG. 15 include local communications systems 80. In one embodiment, the local communications system 80 are cellular systems. In the cellular systems, the personal communications devices 2, including devices 2-1, 2-2 and 2-3, communicate in small geographic areas called cells. Each cell covers a small geographic area and collectively an array of adjacent cells covers a larger geographic region. The local communications systems 80 include Base Station (BS) which handle all the cellular calls for the personal communications devices 2.

The communications systems of FIG. 15 in some embodiments include local communications systems for emergency, search and rescue such as Civil Air Patrol, Marine, Mountain Rescue, Fire and Police. The air patrol communicates from an aircraft 70 having a local RF transceiver 70. The communications systems of FIG. 15 in some embodiments include one or more satellite communications systems. For example, the GEO satellites 31-1 and 31-2 are in a GEO orbit and the LEO satellites 71-1 and 71-2 are in a LEO orbit.

In FIG. 16, a detailed block diagram is shown of a conventional smartphone. The block diagram is published by Texas instruments at:

http://www.ti.com/solution/handset_smartphone#

The operation of personal communications devices 2 requires execution of code in the one or more processors such as the SP processor 3-1, the SD processor 15-1 of FIG. 12 or the PCD processor 3-1 of FIG. 14. The selection of which one or ones of the processors to employ for execution code is a matter of design choice. The following are examples of the functions to be carried out by execution of code in the personal communications devices 2 represented by the FIG. 12 embodiment.

In FIG. 17, a software defined transceiver 50 is shown. The transceiver 50 includes a receive antenna 51 tuned to the frequency of interest. In some cases, this antenna 51 has less gain than an isotropic dipole and in some cases, the gain may be more than zero dBi. In one embodiment, both conditions are useful. In some embodiments, antenna 51 is embedded within the case of the personal communication device and as such provides minimal size and inconvenience. In other embodiments, antenna 51 is external to the case of the personal communication device and as such adds gain but may require some user participation to set-up and/or point the antenna 51.

The amplifier 52 is a low noise amplifier [LNA]. The amplifier 52 sets the noise figure of the entire radio. The amplifier 52 has very low noise and high gain at the radio frequency pass-band of interest.

The RF filter 53 functions to filter the excess signal outside of the RF pass-band of interest. While any type of filter can be employed, in one embodiment it is a SAW filter.

The tuner 54 converts the RF information to a baseband or an intermediate frequency [IF]. While any type of tuner can be used, in one embodiment, a direct conversion tuner is used to provide substantial gain and minimal costs. The tuner 54 output is at a low enough frequency such that it can be effectively sampled to a digital format.

The A/D converter 55 samples the analog frequency signal from the tuner 54 producing a sampled signal for processing in the microprocessor 56. While most any A/D converter 55 can be used, it must have a sampling rate that meets at least the Nyquist threshold and must not introduce excessive noise to the signal of interest. The sampling rate for the Nyquist threshold is twice the maximum component frequency of the function being sampled in the analog frequency signal.

The microprocessor 56 performs several signal processing functions. For example, microprocessor 56 has algorithms to do one or more of receiver functions such as filtering, demodulation, frequency tuning and bit syncing. Additionally, microprocessor 56 may include receiver algorithms to do bit interpretation and to decode the information protocol. For transmit operations, the microprocessor 56 generates a data signal of interest to be sent to the D/A converter 61. In addition the microprocessor 56 transmit algorithms may include filtering.

The D/A converter 61 is used in the transmit function. The data to be transmitted are prepared in the microprocessor 56 based on the air protocol and are pre-filtered to minimize spurious signals. The prepared and filtered data in digital form from the microprocessor 56 is sent to the D/A converter 61. The D/A converter 61 converts the prepared and filtered data to analog signals.

The analog signals from D/A converter 61 feed the IQ modulator 62. The IQ modulator 62 forms the quadrature signals, I and Q, from analog signals.

The quadrature signals, I and Q, are modulated with an RF carrier in mixer 64. The RF modulation frequency is supplied to the mixer 64 by an oscillator 63. In some embodiments, two or more of the IQ modulator 62, mixer 64 and oscillator 63 are available in single integrated circuits. The output from the mixer 64 is the RF signal for transmission.

The RF signal output from mixer 64 feeds a filter 65 which provides a filtered RF signal for transmission. The filter 65 is used to ensure that the RF signal for transmission meets a mask defined by what is considered acceptable spurious emissions and removes unacceptable spurious emissions.

The filtered RF signal is amplified in a power amplifier 65. The power amplifier 65 provides an amplified signal having adequate power, when combined with the antenna gain, to comply with a satisfactory personal communication device system budget. A satisfactory device system budget allocates all the gains and losses affecting the transmitted signal as it travels from the personal communication device to the satellite such that the transmitted signal is received at the satellite with an acceptable error rate. Similarly, there is a satellite system budget that is the allocation of all the gains and losses affecting the transmitted signal as it travels from the satellite to the personal communication device such that the transmitted signal is received at the personal communication device with an acceptable error rate.

The transmit antenna 66 can be of any design as long as it is resonant at the frequencies of interest and provides enough gain as required by the system budget having an acceptable error rate.

In FIG. 18, a second RF stage 60' is an optional RF converter for extending the RF range of the first stage 60 of the transceiver 50 to frequencies outside of the initial range. When desired, the stage 60' can be added by itself to replace the stage 60 in FIG. 17 or with multiple replicas of FIG. 18 to add additional radio bands of interest.

The effectiveness of communication between satellites and personal communications devices depends on many parameters. The parameters include all of the gains and losses affecting the transmitted signal as it travels from the personal communication device to the satellite. The parameters are selected such that the transmitted signal is received at the satellite with an acceptable error rate. Similarly, the parameters include all of the gains and losses affecting the transmitted signal as it travels from the satellite to the personal communication device. The parameters are selected such that the transmitted signal is received at the personal communication device with an acceptable error rate.

When the signal to noise ratio (SNR) is high, this condition can be exploited by increasing the data rate and increasing the receiver information bandwidth. To increase the receiver information bandwidth, the filter bandwidth in the receiver must be adaptable. When a software defined transceiver is employed, the filter bandwidth in the receiver is easily adaptable and increased under software control.

When the signal to noise ratio is low, the data rate and the receiver information bandwidth are decreased. To decrease the receiver information bandwidth, the filter bandwidth in the receiver must be adaptable. When a software defined transceiver is employed, the filter bandwidth in the receiver is easily adaptable and decreased under software control.

Each reduction of receiver bandwidth by a factor of 2 increases the SNR by 3 dB. Without changing the receiver bandwidth, nothing is accomplished. The SNR goes up or down due to the change in the receiver bandwidth.

Many of the parameters associated with effective communication between satellites and personal communications devices are established in the transceivers of the personal communications devices. When a software defined transceiver 50 such as shown and described in connection with FIG. 17 and FIG. 18 is utilized, the parameters can be dynamically modified to support effective communications with an acceptable error rate.

The parameters are generally selected by defining a system budget that is intended to achieve a high likelihood of communications success. The system budget takes into account many parameters including, but not limited to, the transmit power, receiver performance and antenna properties of the terminal on the ground; the satellite and the earth ground station; the communications properties of the radio medium and likely anomalies. The system budget can be expressed as mathematical representations for all the parameters of components contributing to the transmissions between the personal communications device and the satellite. The system budget is determined such that there is a high likelihood of communications success. The likelihood of communications success is typically measured as the Bit Error Rate [BER].

In general, the system budget in satellite systems is defined with static parameters and does not permit of dynamic changes in the system budget. By way of contrast in terrestrial systems, the system budget and key parameters of the communication link are adaptively changed to ensure that communications are reliable. In one example of parameter changes, the transmission bandwidth is modified to adjust and improve the bit error rate to an acceptable level. Each time the information bandwidth is decreased by a factor 2 times, a 3 dB improvement in link margin is achieved. Accordingly, a link path which is marginal can become a high quality link path if a 2 times decrease in data rate is accepted. The process of reducing the bandwidth by reducing the data rate can be extended to a 4 times decrease in data rate to achieve a 6 dB improvement. The process of reducing the bandwidth by reducing the data rate can be extended to 8 times, 16 times and so on decreases for corresponding dB improvements. When the communication is text or other data transmissions, the reduction in data rate is normally inconsequential as far as the users are concerned. While voice communications may be more sensitive to data rate reductions, the introduction of delays are often acceptable in exchange for improved voice quality.

In addition, the information data rate can be extended when there is extra link margin. By example, a data rate of 2400 bits per sec can go to 4800 bps by expanding the information bandwidth if there is 3 dB of link margin to spare. Such a bandwidth expansion can permit a communications system to go from data only to voice or to go from slow internet access to moderate internet access In addition, the signal processing algorithm can be easily updated as much of the demodulation and decoding is done in software (software defined radio). This means many key parameters (which often define the system performance) can be changed by sending a system software update. This update can come from various sources, but in this embodiment it is quite desirable to send a receiver update by a high-speed, inexpensive data source such as Wi-Fi. Of course the new receiver update can be sent by others means, such as satellite, as well.

The ability to change different parameters associated with an acceptable system budget is enhanced by use of a software defined transceiver as described in connection with FIG. 17 and FIG. 18.

Low Signal Code. Under normal high signal strength operation, the personal communications device 2 is operating in local cellular communications mode and the satellite communications is silent. When the received signal strength indicator (RSSI) in the smartphone 2 indicates that the cellular network communication strength is below a threshold, it suggests that sending or receiving a message via the local cellular network is not likely to get through. This low level signal strength indication is detected and initiates the Low Signal Code Algorithm (LSA).

In most cases, the LSA will immediately begin the satellite communications process. This process entails a) putting the local cellular communicator in the smartphone 22 in airplane mode, turning OFF the cellular radio in the smartphone 22; b) waking up the L band transverter in the satellite RF unit 7 of the satellite device 23; c) begin executing the transaction processing code for the transaction processing algorithm (TPA) and d) update the user screen in the smartphone 22 providing the user with new options that come with the satellite communications application. Examples of options include Google SMS search, email indexing and Mayday callout.

The LSA does not begin the satellite process when the RSSI signal strength indicator is intermittently adequate. In such cases, test code using hysteresis of the RSSI signal strength indicator will evaluate the need to switch to satellite communications. As a result of the test, a decision to switch to satellite mode is made. Similarly, if the RSSI signal strength indicator test indicates that cellular communications can be performed while the communications is in satellite mode, a decision will be made whether to switch to cellular mode.

Low Energy Code. When the smartphone 22 has a low battery level, the energy monitoring code will initiate the Low Energy Algorithm. The energy monitoring code will check the RSSI indicator to evaluate the cellular communications signal strength. If the cellular communications signal strength is also low, a message is displayed on the display/touch screen 10-1 of smartphone 22 indicating that the smartphone 22 will be placed in Airplane Mode to conserve energy. This operation allows the smartphone 22 to retain adequate energy to complete a satellite message when needed.

Mayday Emergency Code. In order to respond to a significant emergency, a special input is provided to override and take priority over all other functions. The special input in one embodiment is a "Mayday Button" touch screen button displayed on the display/touch screen 10-1 of the smartphone 22. Alternatively, the satellite device 23 includes a physical button (not shown) that provides a "Mayday Signal" to activate the Mayday Code. Upon activation, the mayday code will execute the Mayday Processor Algorithm (MPA). In such case, the MPA will a) get a GPS fix on the location of the personal communications device 2, b) evaluate all communications paths to find out which communications paths are feasible; c) calculate satellite positions of appropriate satellites; d) evaluate the nature of the emergency, for example, by posing a small number of questions (four to five) to the user; e) select and then activate all appropriate transmitters and receivers.

Satellite Pointing Code. The satellite antennas 9 (see FIG. 4) of the personal communications devices 2 tend to be omnidirectional. However, by pointing the antenna in the satellite direction, sometimes a few dB of pointing gain can be achieved. This gain can make the difference between a successful satellite communication link and not. When communicating with satellites, a) the GPS location and the 3d orientation of the phone and b) the location of the satellite are known. This information allows the user to point the phone in the optimal direction toward the satellite for best communications gain. The satellite pointing code is executed using this information to perform the Satellite Pointing Algorithm (SPA). The SPA provides guidance in a user friendly way so that the user can reposition the orientation of the personal communications devices 2 as needed.

Occlusion Code. In general, when there is clear sky between the personal communications devices 2 and the satellite, the messages to the satellite will get through. However, when there is an object of size (and bulk) in between the personal communications devices 2 and the satellite, the signal may or may not get through. The sensing of an occlusion is achieved by an Occlusion Algorithm using images from the camera 10-2, the view angle as determined by the Satellite Pointing Algorithm and execution of pattern recognition software.

In some case, the Occlusion Algorithm will be able to recognize a problem and provide some suggestions to the user for repositioning. Often the suggestions are as simple as "move right" or "move left". Sometimes the guidance to the user will be more complex.

Battery Management Code. Battery management code performs a Battery Management Algorithm (BMA) which keeps track of energy spent and energy available. The BMA determines the energy required to communicate by cellular and by satellite. The BMA determines the current charge state of the batteries, battery 4-2 in the smartphone 4-2 and battery 16-2 in the satellite device 16-2. The BMA also manages the charging of the capacitors FIG. 16-3 (when needed) and the recharging of all batteries and capacitors.

An external plug 19 is provided to power the personal communications devices 2 in emergency conditions.

Transaction Processing Code. When satellite messages are sent or received, charges for this service are applied. The reimbursement for these charges will be by credit or debit card. However, in most cases, the transaction information will be stored on the personal communications devices 2 and maintained until the next time that the personal communications devices 2 is within cellular range. Typically, the transaction costs and other data are not sent over the satellite channel. When the personal communications devices 2 is within cellular range, the accumulated transactions and charges are dumped to a processing center such as Paypal or Square which will complete payments and processing for the transactions.

It is evident from the foregoing description that the personal communications device 2 has many uses and features which are further hereinafter described.

a) The personal communications device 2 has augmented reality for satellite antenna positioning to increase the gain and therefore better achieve acceptable communications. This augmented reality uses knowledge of the satellite location and personal communications device 2 location to visually or audibly point to the location of the desired satellite whereby the user can move the personal communications device 2 to a most favorable orientation.

b) The personal communications device 2 is conveniently locates a satellite device as a transverter in an exterior case that holds and connects to a smartphone thereby allowing the smartphone to use frequency transverter to communicate with satellites.

c) The personal communications device 2 allows the smartphone to use space-texting with data fields which send/receive text messages over a satellite.

d) The personal communications device 2 permits SOS broadcasts using multiple satellites (LEO and GEO) whereby such satellite diversity insures communications anywhere in the world.

e) The personal communications device 2 permits SOS/911 broadcasts with information on the nature of the emergency communicated and permits use of artificial intelligence to ask appropriate questions to determine the nature of the emergency.

f) The personal communications device 2 permits Satellite polling for incoming messages ("anybody calling me?") polling technique to find out if anyone is calling.

g) The personal communications device 2 permits satellite SMS space texting to search engines to initiate search engine look-ups.

h) The personal communications device 2 permits watt-second power management.

i) The personal communications device 2 permits rural 911 emergency processing of satellite texting to enable faster 911 responses.

j) The personal communications device 2 permits satellite communications to find the nearest gas station or other facility.

k) The personal communications device 2 permits First Aid look-up and in some embodiments stores locally a first aid guide.

l) The personal communications device 2 permits hierarchical texting progression where cellular texting is attempted first and, if not successful, then satellite texting is tried.

m) The personal communications device 2 permits E-mail check-in to see what messages are on a user's server and send messages such as "I am on a mountain" or "do I have any emails?"

n) The personal communications device 2 permits a smartphone to have an external cover that also serves as a platform for a satellite antenna.

o) The personal communications device 2 permits payments by credit card for text messages for satellite or other communications.

p) The personal communications device 2 permits 911 text via a satellite to PSAP.

q) The personal communications device 2 permits storage of reserve energy, "one last jolt", to be used in case of a significant emergency.

r) The personal communications device 2 permits "magic hands", a look and feel tool for instructions on operating and using personal communications device 2.

s) The personal communications device 2 permits, during national and large scale emergencies, broadcast reception and response even when local and grid power is not available.

t) The personal communications device 2 permits snap back with embedded electronics.

u) The personal communications device 2 permits flex circuits which extends around a smartphone for interconnecting the satellite device.

v) The personal communications device 2 permits circuitry built into a car or other vehicle for Bluetooth or NFC communications with a smartphone.

w) The personal communications device 2 permits finding the location of a car or other property via communications between the personal communications device 2 and the satellite.

x) The personal communications device 2 permits operation to find the speed of a car (or to sound an alarm for excess speed).

y) The personal communications device 2 permits a GPS fence.

z) The personal communications device 2 permits location-based transit by exception-supply.

aa) The personal communications device 2 permits tracking of children and sounding child abduction alarms.

bb) The personal communications device 2 permits refined pointing angle to improve communications to a satellite.

cc) The personal communications device 2 permits pattern recognition to identify/refine pointing angle occlusions.

dd) The personal communications device 2 permits VHF voice to first responders.

ee) The personal communications device 2 permits segregated responder categories (for example, a first responder has priority over other communications).

ff) The personal communications device 2 permits selection of the number of symbols/second (3000, 1200, other) that are employed.

The personal communications device 2 services include telephony, text messaging, multimedia service, email, internet service, and many business applications. These services are provided even when there is no cellular coverage.

The personal communications device 2 sends a voice message to another party and in a vehicle, the personal communications device 2 digitizes a voice sentence (or three) and sends this voice message via satellite to any phone or email destination. A voice message sent to a person in a vehicle is delivered over the vehicle's car audio system.

While the invention has been particularly shown and described with reference to preferred embodiments thereof it will be understood by those skilled in the art that various changes in form and details may be made therein without departing from the scope of the invention.

The invention claimed is:

1. A portable communications device (PCD) for communications with two or more communications systems comprising,
   a power unit configured to power the portable communications device,
   a transceiver unit including,
   a local unit configured to communicate with a local communications system,
   a satellite unit configured to communicate with a satellite communications system,
   a control unit configured to control communications by the local unit and the satellite unit, the control unit including,
   a sensing algorithm designed to sense requests for communications,
   a selection algorithm designed to automatically select the local unit or the satellite unit for communications,
   wherein the control unit is configured to monitor a received signal strength indicator, during communications using the local unit, to determine if the local unit network communication strength is below a threshold, and is further configured to initiate a low signal code algorithm if the local unit network communication strength is intermittently below the threshold, and
   wherein the monitoring of the received signal strength indicator comprises monitoring a frequency with which and a duration that the local unit network communication strength is below the threshold, and if the frequency or the duration exceeds a respective low signal control parameter, the control unit is configured to initiate the low signal code algorithm, wherein, as part of the low signal code algorithm, the control unit is further configured to perform a hysteresis test on the local unit network communication strength to determine whether, in a case in which the local unit network communication strength falls below the threshold only intermittently, the frequency with which the local unit network communication strength falls below the threshold is sufficient to exceed the low signal control parameter for frequency,
   wherein: (a) if the low signal code algorithm is not initiated or determines, during the hysteresis test, that the frequency with which the local unit network communication strength falls below the threshold is not sufficient to exceed the low signal control parameter for frequency, the PCD continues communications using the local unit; (b) if the low signal code algorithm determines, during the hysteresis test, that the frequency with which the local unit network communication strength falls below the threshold is sufficient to exceed the low signal control parameter for frequency, the PCD switches to communications using the satellite unit.

2. The device of claim 1 wherein the low signal code algorithm automatically selects satellite communications, switches local communications to OFF and turns satellite communications to ON.

3. The device of claim 2 wherein the local communications is cellular and the cellular unit includes a cellular radio that is turned OFF and wherein the satellite unit includes a satellite radio that is turned ON.

4. The device of claim 1 wherein the option is one or more of a Google Search, e-mail indexing and MayDay call out.

5. The device of claim 1 wherein the control unit includes a parameter algorithm for controlling communications for the device based upon parameters.

6. The device of claim 5 wherein the parameter algorithm is designed to monitor a battery level and to use a low battery parameter to trigger turning off the transceiver local unit so as to reserve battery power for satellite communications.

7. The device of claim 5 wherein the parameter algorithm is designed to use a bandwidth parameter to control data rate.

8. The device of claim 5, wherein the parameter algorithm is further designed to use a low local unit signal strength criterion, in combination with monitoring the battery level, to trigger the turning off the transceiver local unit.

9. The device of claim 1, wherein the PCD comprises a smartphone and a satellite device configured to connect to the smartphone via a wired or wireless connection, wherein the satellite device is configured to enable the smartphone to be nested in a case of the satellite device, wherein the satellite device comprises at least the satellite unit and a satellite antenna.

10. The device of claim 9, wherein the satellite antenna is swivelably attached to the case of the satellite device.

11. The device of claim 9, wherein the satellite antenna is contained in a flap of the case of the satellite device, wherein the flap is configured to swivel with respect to a portion of the case of the satellite device in which the smartphone is enabled to be nested.

12. The device of claim 1, wherein the local unit network communication strength corresponds to a local unit network received signal strength.

13. A portable communications device (PCD) for communications with two or more communications systems comprising,
   a power unit configured to power the portable communications device,
   a transceiver unit including,
   a local unit configured to communicate with a local communications system,
   a satellite unit configured to communicate with a satellite communications system,
   a control unit configured to control communications by the local unit and the satellite unit, the control unit including,
   a sensing algorithm designed to sense requests for communications,
   a selection algorithm designed to automatically select the local unit or the satellite unit for communications as a selected communication unit,
   wherein the control unit is configured to monitor a communication signal quality associated with the selected communication unit, wherein the signal quality is determined using a hysteresis-based testing algorithm on received signal strength to determine a frequency with which the received signal strength falls below or exceeds a threshold parameter and using a duration test to determine a duration during which the received signal strength falls below or exceeds the threshold parameter, wherein satisfying either test triggers selection of the unselected communication unit, and to automatically select the one of the local unit or the satellite unit that is not the selected communication unit if the selected communication unit signal quality fails to meet a predetermined criterion for the hysteresis-based test or a predetermined criterion for the duration test, wherein the automatically selecting of the one of the local unit or the satellite unit that is not the selected communication unit includes automatically initiating a communication with a same party that was called using the selected local unit or satellite unit using the one of the local unit or the satellite unit that is not the selected communication unit.

* * * * *